UNITED STATES PATENT OFFICE.

ELMER A. SPERRY, OF BROOKLYN, NEW YORK.

RECLAIMING TIN-SCRAP.

No. 879,596.    Specification of Letters Patent.    Patented Feb. 18, 1908.

Application filed October 8, 1906. Serial No. 337,883.

*To all whom it may concern:*

Be it known that I, ELMER A. SPERRY, a citizen of the United States, residing at Brooklyn, in the county of Queens and State of New York, have invented new and useful Improvements in Reclaiming Tin-Scrap, of which the following is a specification.

My invention relates to a method of reclaiming the values from tin scrap.

Tin scrap is practically a waste product, for while it may contain iron to the amount of fourteen to sixteen dollars and tin to the amount of twenty dollars per ton, yet the mass as it stands brings only a very small fraction of this sum, as there are but few uses to which it can be put, one of them being to melt and cast into rough forms such as window weights, flask weights, etc., where "hardhead" may be employed. Iron in this form is practically worthless, as it is almost impossible to machine it or work it in any manner. It is therefore the re-claiming of these values which constitutes the object of the present invention.

The conditions in the case of tin scrap are peculiar, for while the iron with a small trace of tin is practically worthless, the same in a measure is true of the tin after being removed from the scrap, especially while it contains a small percentage of iron. To illustrate, the great use of tin is in the production of tin plate. For this purpose pure tin is required as impurities dull the luster and render the plate less resistive and more easy of attack by oxygen, moisture, etc. For this purpose the tin should be at least .995 fine. It is well-known that tin has the peculiarity of alloying with nearly all other metals. Were tin merely on the surface of the iron or steel plate, its removal might be easily accomplished, but its usefulness would in all probability be very limited. As it is there is no clearly defined surface-line or junction, but on the contrary there exists a layer or zone where the two metals are actually alloyed or dissolved in each other, which assures a remarkable degree of adhesion and persistence to the tin coat. The tin might be removed down to this zone of alloy but this has been found to leave a prohibitive amount of tin on the "black scrap" which should not carry to exceed four-hundredths per cent. tin to be commercial. In fact denuding tin scrap of its tin down to the point required becomes a difficult problem and involves removing at least sixty-four sixty-fifths or thereabouts of the total tin. Another problem is also involved, namely that of saving the tin thus removed in a condition from which its values may be recovered, for as we have seen it must be pure and no processes are now known which do not attack the iron to a more or less degree while removing the tin; especially is this true where the alloyed zone is attacked throughout the enormous surface exposed and iron brought away with the tin recovered.

In stating my invention as being the reclamation of tin scrap, I mean the substantial reclaiming of full values of each of the elements; this, to my knowledge, has never been accomplished in the manner set forth herein.

In the case of both acid and alkaline solvents, the "black scrap" is practically ruined, or the subsequent neutralizing and bringing into commercial condition is so expensive as to be prohibitory. Furthermore the tin so removed is usually contaminated with iron to a degree which makes substantial inroads on the tin values recovered.

Electrolysis, especially in alkaline solution aids in preserving the black scrap from destructive oxidation, but if pushed to a commercial point of removal of tin, the tin sponge or product produced runs high in iron.

Processes have been suggested where the scrap is treated direct in solutions and also in anhydrous liquids, but nothing commercial in this line has yet been produced. In this connection it is only under peculiar conditions that commercial results can ever be expected to follow in the application or development of a liquid worth say five dollars per gallon, especially where the liquid is more or less volatile and where the surfaces involved are over a quarter of an acre per ton of scrap subjected to the process. In this case a comparatively slight loss of the material would be disastrous and it is also only under peculiar conditions that all of the surfaces, especially where more or less compacted into extensive capillary crevices even if reached, can be cleared of the material. Again, most of these materials are corrosive in the extreme, and if allowed to remain even in greatly diluted form upon the surface, destructive corrosion is found to begin forthwith, not stopping until all of the black scrap is converted into oxid and practically destroyed.

My invention, therefore, consists in so handling the scrap that the full values of both elements may be realized. To this end I first concentrate the values. I then treat each of the ingredients to fit them for the market. The black scrap I render alkaline as to reaction to prevent oxidation, and compress the same in billets to facilitate its handling in the furnace. The tin concentrates I put through various processes of treatment, calculated to bring out to the very fullest extent their values, not only as to percentage of tin reclaimed and put into commercial form, but also selecting a form for the tin, such as a tin compound which has a value considerably in excess of regulin metal. To illustrate these steps, I may say that one form of concentration may consist in electrolyzing the scrap in an alkaline solution wherein the solution is so constituted that such iron as is necessarily dissolved, especially from the alloyed zone above described, during the complete removal of the tin is deposited in a form where it may be subsequently removed. As an illustration of this feature I would say that an alkaline electrolyte, say sodium hydrate associated with more or less of a halogen salt will deposit the iron factor, either in the form of ferro-ferric oxid or as metallic iron, commingled with the tin sponge. The sponge is then taken, preferably under seal or without exposure to the air, and treated for arresting, first its oxidation by the air, and secondly, its conversion into stannate. This latter feature is of special advantage inasmuch as a very small residual sodium factor of the electrolyte serves to combine with a very large quantity of tin. I prefer to leave the tin in so far as possible in its metallic state instead of being combined with oxygen or any other element. I then further concentrate the tin sponge. To illustrate this step, I may run it through one or more magnetic separators, with or without pulverization the iron factor may thus be almost wholly removed. It is now in suitable shape to be simply melted, preferably under seal, and reclaimed in the form of highly refined tin, practically free from iron; or I may proceed further and utilize the fact that the tin is already in a highly comminuted state and proceed to convert this tin into some of its chemical forms, choosing those especially suited to the physical condition of the product. To illustrate this step, I would say that the product is thoroughly dried and brought into contact with the reacting agent, for instance, chlorin. To accomplish this I prefer to submerge the product in a liquor, preferably an anhydrous liquor, for instance, tetra chlorid of tin within a suitable reaction vessel provided with means for agitation and also means for temperature control, and under these conditions introduce the chlorin in such a manner that it may be first absorbed by the liquor and then passed on to the tin, which between given temperature limits, say 15 and 100 centigrade, will be found to react, forming stannic chlorid. The gases as they are introduced, and also the effluent gases from such a body or reacting mass, must be heated, or say insulated or covered, so the heat which they contain, which should be above 65 degrees centigrade, should not escape; the chlorin together with any commingled gases should be dry before being introduced. The effluent gases I treat in various ways, first, I may chill them, thereby producing a twofold result; first condensing the fuming chlorid, and, secondly, depositing the stannic hydrid in the form of crystals, causing in this way a separation of these two products. The residuary gases are then treated with solvents, preferably at a temperature above the normal, first, a solvent for the stannic chlorid vapors, and secondly, a solvent for any residuary chlorin that may be associated with vapors or residuary gases, or be entrained thereby. To illustrate this step, I may lead these effluent gases and vapors through any form of chilled condenser provided with an escape at the bottom for the liquids and any sort of large opening to provide free access for the removal of the crystals. From this condenser the residuary gases and vapors may be led through a scrubber or tower where they may be exposed to a very greatly extended surface of, or surface wetted by, a suitable solvent, such, for instance, as a weak solution of stannous chlorid, which it will be seen will at once dissolve both the stannic chlorid vapors and the chlorin.

The processes outlined above may go forward until the re-action vessel has become sufficiently filled with the accumulated anhydrous stannic chlorid, it is purified as by distillation and to this end the cooling jackets may now be employed, or other heating means may be utilized for purposes of boiling and distilling off, preferably while still in a state of agitation. This step consists in driving off the chlorin which it is first desirable to remove before proceeding with the distillation proper. To remove the chlorin I prefer to introduce a calculated amount of additional tin powder, but I may drive it off by heating the liquor and allowing the effluent vapors from the condenser to pass to the scrubber as explained.

Vapors of anhydrous tetrachlorid of tin being suitably condensed, the product may be accumulated in iron drums which may be utilized for shipment of the material direct.

The process of distillation proceeds until only a small residue exists, which is gradually dried to a point where no further distillation is produced. The condenser is then cut out and air, preferably heated air, is introduced while still agitating the residue, the fumes being led to the scrubber as explained, this operation going forward until the residues have been thoroughly dried and the stannic chlorid removed therefrom. In the latter part of this process dust tends to rise from the mass, and pass to the scrubber, which may be arrested by any suitable separator or dust-catcher, which is preferably kept hot to prevent accumulation of hydrate crystals which would otherwise tend to clog and interfere with its operation. The residues of this process are found to consist in such slight amounts of tin powder as have become oxidized, together with any iron, lead or other metals or non-metallic elements that may have been introduced with the powder. The values from these are recovered by suitable concentration, first, separation,—preferably a magnetic separation,—of the dry residue and smelting the concentrate, either direct or after neutralization and precipitation, and leaving in an alkaline reaction as by an alkaline solution, such, for instance, as NaOH or milk of lime. The tin product thus procured is a material consisting of 45.7 of tin and 54.3 per cent. of chlorin in the form of a water white distillate, perfectly chemically pure, and constitutes when greatly diluted with pure water the purest and most effective material known for mordanting, weighting and otherwise treating fibers and fabrics, and commands a price, as it should, which is in excess of the sum of the prices of the ingredients.

While I have described one method of carrying my process of reclaiming tin scrap into effect, yet I do not wish to be limited in exact detail of the steps themselves or their relation one to the other, as the foregoing description is simply given as illustrating one method of carrying the process into effect. It will therefore be seen that steps may be substituted for some of those described whereby the ends that are to be gained may be accomplished, and others may be omitted without interfering with the successful prosecution of the process, and the invention extends to such use.

By following the above specification it will be seen that we have reclaimed to the very fullest degree the values of the tin scrap, having produced from the iron the highest grade of wrought material and in form particularly suited for furnacing, and from the tin factor there has been produced a tin compound which is of value considerably in excess of the sum of the values of its ingredients. It will furthermore be seen that the step of first concentrating the tin scrap before proceeding with the reclamation of its values affords great advantage over the processes which have heretofore been proposed inasmuch as when it is desired to utilize the tin values to anything like their fullest extent, we are not confronted with the problem of treating enormous masses with expensive liquids or evolving on these enormous surfaces such expensive liquids, but in the other hand have simply to treat a very small tin concentrate, representing only about one-hundredth of the bulk and about one-fortieth of the weight, and it thus comes about that this treatment becomes thoroughly practical and commercial, involving as it does only very small quantities of any liquid re-agent or carrier, and also an extremely small reaction vessel. Again the steps of farther concentrating and refining the tin concentrate has the advantage that the mass treated is highly concentrated and only a very slight quantity of residue remains which may carry off the values and require reclaiming and re-treatment to prevent losses.

The substance produced in the above case, viz: tetra chlorid of tin is one of peculiar interest and significance inasmuch as it may be distilled and therefore rendered perfectly chemically pure, while at the same time it affords the basis of producing nearly all the other useful tin compounds, namely, stannous chlorid, tin oxid, and regulin metal, all of which bodies are of almost perfect constitution and of extreme purity.

I claim:

1. The method of reclaiming tin scrap which consists in concentrating the tin values, removing the black scrap, treating the impure tin concentrate with free chlorin in the presence of anhydrous stannic chlorid, removing the excess chlorin from the chlorid and distilling off the stannic chlorid from the residues.

2. The method of reclaiming tin scrap which consists in concentrating the tin factor, removing the black scrap therefrom and converting the tin concentrate into an anhydrous compound for the purpose specified under conditions of temperature control.

3. The method of reclaiming tin scrap which consists in concentrating the tin factor, removing the black scrap therefrom, submerging the tin concentrate in an anhydrous liquid and treating the same with chlorin.

4. The method of reclaiming tin scrap which consists in concentrating the material by electrolysis in an alkaline bath, removing the black scrap treating the tin concentrate to render it comparatively inert with regard to the air.

5. The method of reclaiming tin scrap which consists in concentrating the material by electrolysis in an alkaline bath, removing the black scrap treating the tin concentrate to render it comparatively inert as against farther chemical action on the part of the electrolyte.

6. The method of reclaiming tin scrap which consists in concentrating the material by electrolysis in an alkaline bath, removing the black scrap treating the tin concentrate to neutralize same.

7. The method of reclaiming tin scrap which consists in electrolytically concentrating the material, in an electrolyte which is active with reference to the tin concentrate, washing the concentrate removing the black scrap and then treating it chemically to arrest the action of the electrolyte in the presence of air.

8. The method of reclaiming tin scrap which consists in concentrating the tin factor, removing the black scrap therefrom, drying the tin concentrate and converting the tin concentrate into an anhydrous compound for the purpose specified.

9. The method of retaining tin scrap which consists in concentrating the tin factor, removing the black scrap therefrom, treating the tin concentrate to further concentrate same and then converting the tin concentrate into an anhydrous compound for the purpose specified.

10. The method of reclaiming tin scrap which consists in concentrating the tin factor, removing the black scrap therefrom, submerging the tin concentrate in an anhydrous liquid, agitating the mass, and treating such agitated mass with chlorin.

11. The method of reclaiming tin scrap which consists in concentrating the tin factor, removing the black scrap therefrom, submerging the tin concentrate in a mass of anhydrous stannic chlorid, and treating the mass with chlorin.

12. The method of reclaiming tin scrap which consists in concentrating the tin factor, removing the black scrap therefrom, submerging the tin concentrate in a mass of anhydrous stannic chlorid, agitating the mass, and treating the same with chlorin.

13. The method of reclaiming tin scrap which consists in concentrating the tin factor, removing the tin scrap therefrom, submerging the tin concentrate in a mass of anhydrous stannic chlorid, treating the mass with chlorin, and then distilling stannic chlorid from the mass.

14. The method of reclaiming tin scrap which consists in concentrating the tin factor, removing the black scrap therefrom, submerging the tin concentrate in a mass of anhydrous stannic chlorid, heating the mass and distilling stannic chlorid therefrom.

15. The method of reclaiming tin scrap which consists in electrolytically concentrating the tin values in an electrolyte containing a halogen salt, removing the black scrap, magnetically treating the tin bearing product and thus removing the iron therefrom.

16. The method of reclaiming tin scrap which consists in concentrating the tin factor, removing the black scrap therefrom, submerging the tin concentrate in a mass of anhydrous stannic chlorid, treating same with chlorin, treating the mass with tin for absorbing the excess chlorin and then distilling the stannic chlorid from such mass.

17. The method of reclaiming tin scrap which consists in concentrating the tin factor, removing the black scrap therefrom, submerging the tin concentrate in a mass of anhydrous stannic chlorid, treating the mass with chlorin, and then distilling stannic chlorid from the mass under conditions of agitation.

18. The method of reclaiming tin scrap which consists in concentrating the tin factor, removing the black scrap therefrom, submerging the tin concentrate in a mass of anhydrous stannic chlorid, treating the mass with chlorin, distilling stannic chlorid from the mass with heat to a pre-determined point and then with the addition of an inert gas.

19. The method of reclaiming tin scrap which consists in concentrating the tin factor, removing the black scrap therefrom, submerging the tin concentrate in a mass of anhydrous stannic chlorid, treating the mass with chlorin, distilling stannic chlorid from the mass with heat to a pre-determined point and then with the addition of a heated inert gas.

20. The method of reclaiming tin scrap which consists in concentrating the tin factor, removing the black scrap therefrom, submerging the tin concentrate in a mass of anhydrous stannic chlorid, treating the mass with chlorin, distilling stannic chlorid from the mass with heat to a pre-determined point and then with the addition of heated air.

21. The method of reclaiming tin scrap which consists in concentrating the tin factor, removing the black scrap therefrom, submerging the tin concentrate in a mass of anhydrous stannic chlorid, treating the mass with chlorin, distilling stannic chlorid from the mass with heat to a pre-determined point and then with the addition of an inert gas under conditions of agitation.

22. The method of reclaiming tin scrap which consists in concentrating the tin factor, removing the black scrap therefrom, submerging the tin concentrate in a mass of anhydrous stannic chlorid, treating the mass with chlorin, and then distilling stannic chlorid from the mass, removing the residues and smelting same.

23. The method of reclaiming tin scrap which consists in concentrating, submerging the tin concentrate in a mass of anhydrous stannic chorlid, treating the mass with chlorin, and then distilling stannic chlorid, from the mass, removing the residues, concentrating and smelting same.

24. The method of reclaiming tin scrap which consists in concentrating the tin factor, removing the black scrap therefrom, submerging the tin concentrate in a mass of anhydrous stannic chlorid, treating the mass with chlorin, and then distilling stannic chlorid from the mass, precipitating the residues as described and concentrating the precipitate.

25. The method of reclaiming tin scrap which consists in electrolytically concentrating the tin values in an electrolyte containing a halogen salt, removing the black scrap, treating the tin concentrate to eliminate the foreign materials and treating the refined tin product with a suitable reagent to form a compound of tin.

26. The method of reclaiming tin scrap which consists in electrolytically concentrating the tin factor in an alkaline electrolyte, removing the resulting black scrap, washing and rinsing same, treating such scrap with an alkaline solution and while in an alkaline reaction billeting same; removing the tin concentrate, washing and drying same to prevent oxidation, drying and heating same and treating the concentrate with chlorin in the presence of a suitable anhydrous liquid, under conditions of agitation and temperature control, treating the resulting chlorid for the removal of excess chlorin, separating same from the residues and treating the residues substantially as described.

In testimony whereof I have hereunto set my hand in presence of two subscribing witnesses.

ELMER A. SPERRY.

Witnesses:
　JOHN MALONE,
　E. F. HUDSON.